US012801186B2

(12) United States Patent
Shibayama et al.

(10) Patent No.: US 12,801,186 B2
(45) Date of Patent: Nov. 17, 2026

(54) CIRCUIT BOARD AND ELECTRONIC APPARATUS

(71) Applicant: Lenovo (Singapore) Pte. Ltd., Singapore (SG)

(72) Inventors: Yoshiyuki Shibayama, Kanagawa (JP); Fumitake Mizoguchi, Kanagawa (JP); Yuichi Onda, Kanagawa (JP); Sara Akiyama, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 82 days.

(21) Appl. No.: 18/972,103

(22) Filed: Dec. 6, 2024

(65) Prior Publication Data

US 2025/0231591 A1 Jul. 17, 2025

(30) Foreign Application Priority Data

Jan. 15, 2024 (JP) ................................ 2024-004114

(51) Int. Cl.
*G06F 1/16* (2006.01)

(52) U.S. Cl.
CPC .................................. *G06F 1/1679* (2013.01)

(58) Field of Classification Search
CPC .... G06F 1/1679; G06F 1/1656; G06F 1/1658; G06F 1/203; G05F 1/185
See application file for complete search history.

(56) References Cited

U.S. PATENT DOCUMENTS 5,754,412 A * 5/1998 Clavin .................. H05K 7/142 24/453
10,185,374 B2 * 1/2019 Yang ...................... G06F 1/187
2017/0371383 A1 * 12/2017 Yang ...................... F16B 21/02

FOREIGN PATENT DOCUMENTS

JP H08-011948 A 1/1996
JP 2018-082653 A 5/2018
JP 2020057737 A 4/2020
JP 3234805 U 10/2021

OTHER PUBLICATIONS

Machine translation of JP-3234805-U. (Year: 2026).*
Office Action issued in corresponding Japanese Patent Application No. 2024-004114, dated Dec. 17, 2024 (4 pages).

* cited by examiner

*Primary Examiner* — Michael Pervan
(74) *Attorney, Agent, or Firm* — Osha Bergman Watanabe & Burton LLP

(57) ABSTRACT

A circuit board includes: a connector connecting one end of an electronic module, and a supporting tool supporting the other end of the electronic module, both being mounted on the circuit board (the supporting tool includes a stud member having a flange fixed to a surface of the circuit board and a protruding portion rising from the flange); a lock member which is supported so as to be rotatable relative to the protruding portion and is switchable between a locked position in which the other end of the electronic module is pressed and an unlocked position in which the other end is released from pressing; and a torque generating portion which applies a rotational torque to the rotation of the lock member.

10 Claims, 12 Drawing Sheets

CIRCUIT BOARD AND ELECTRONIC APPARATUS

CROSS-REFERENCE TO RELATED APPLICATIONS

This application claims priority to Japanese Patent Application No. 2024-004114 filed on Jan. 15, 2024, the contents of which are hereby incorporated herein by reference in their entirety.

TECHNICAL FIELD

The present invention relates to a circuit board and an electronic apparatus having the circuit board.

BACKGROUND

An electronic apparatus such as a laptop PC uses an electronic module such as an SSD connected to a connector on a circuit board (motherboard) on which a CPU is mounted (see, for example, Japanese Unexamined Patent Application Publication No. 2020-057737).

As described even in Japanese Unexamined Patent Application Publication No. 2020-057737, typically, one end of an electronic module is connected to a connector mounted on a circuit board, and the other end thereof is supported on the circuit board by a screw. Incidentally, the electronic module may be installed by an operator at a factory or the like or in addition, may be replaced by a user himself or herself. In this case, there is a possibility that the screws fall into the chassis and require a lot of time and effort to retrieve, or may be lost, thereby reducing the workability of attaching and detaching the electronic module.

SUMMARY

One or more embodiments of the present invention provide a circuit board capable of improving the workability of attaching and detaching an electronic module, and an electronic apparatus having the circuit board.

A circuit board according to one or more embodiments of the present invention includes a connector connecting one end of an electronic module, and a supporting tool supporting the other end of the electronic module, both of which are mounted on the circuit board. In the circuit board, the supporting tool includes a stud member having a flange fixed to a surface of the circuit board and a protruding portion rising from the flange, a lock member which is supported so as to be rotatable relative to the protruding portion and is switchable between a locked position in which the other end of the electronic module is pressed and an unlocked position in which the other end is released from pressing, and a torque generating portion which applies a rotational torque to the rotation of the lock member.

An electronic apparatus according to one or more embodiments of the present invention includes a circuit board on which a connector is mounted, an electronic module having one end connected to the connector, and a supporting tool which supports the other end of the electronic module on the circuit board. The supporting tool includes a stud member having a flange fixed to a surface of the circuit board and a protruding portion rising from the flange, a lock member which is supported so as to be rotatable relative to the protruding portion and is switchable between a locked position in which the other end of the electronic module is pressed and an unlocked position in which the other end is released from pressing, and a torque generating portion which applies a rotational torque to the rotation of the lock member.

According to one or more embodiments of present invention, the workability of attaching and detaching an electronic module can be improved.

DETAILED DESCRIPTION

Hereinafter, embodiments of an electronic apparatus and a circuit board according to the present invention will be given and described in detail with reference to the accompanying drawings.

Figure 1:
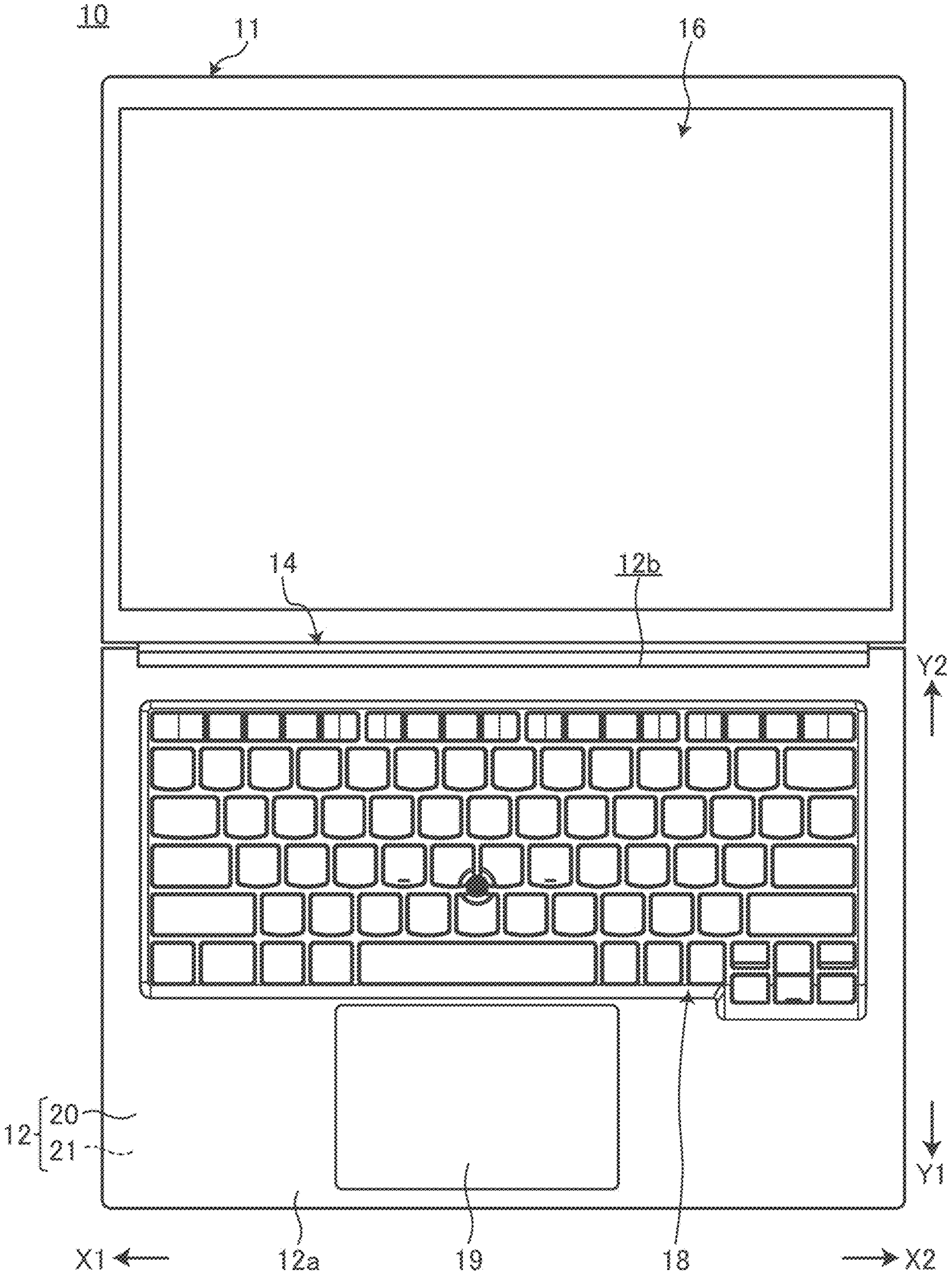
FIG. 1 is a top-down view of an electronic apparatus according to one or more embodiments.

FIG. 1 is a top-down view of an electronic apparatus 10 according to one or more embodiments. As illustrated in FIG. 1, the electronic apparatus 10 according to one or more embodiments is a clamshell laptop PC. The electronic apparatus 10 has a configuration in which a lid 11 and a chassis 12 are connected by a hinge 14 so as to be capable of rotating relative to each other. In one or more embodiments, although the electronic apparatus 10 of the laptop PC is illustrated, the electronic apparatus may be, for example, a desktop PC, a tablet PC, a smartphone, a portable game machine, or the like other than the laptop PC.

The lid 11 has a thin, flat and box-shaped chassis. The lid 11 is mounted with a display 16. The display 16 is, for example, an organic EL display or a liquid crystal display.

The chassis 12 is a thin and flat box. A keyboard device 18 and a touch pad 19 face an upper surface (surface 12*a*) of the chassis 12. Hereinafter, the chassis 12 and each of components mounted thereon will be described based on the posture of an operator operating the keyboard device 18 with the width direction (left and right) of the chassis 12 referred to as X1 and X2 directions, the depth direction (front and rear) of the chassis 12 referred to as Y1 and Y2 directions, and the thickness direction (top and bottom) of the chassis 12 referred to as Z1 and Z2 directions, respectively. The X1 and X2 directions are sometimes collectively referred to as an X direction, and the Y1 and Y2 directions and the Z1 and Z2 directions are sometimes similarly referred to as a Y direction and a Z direction respectively. These directions are determined for the convenience of description, and may of course change depending on the use state or installation attitude of the electronic apparatus 10, etc.

The chassis 12 is constituted by overlapping a first cover member 20 and a second cover member 21 in the thickness direction and removably connecting them to each other. The first cover member 20 forms, for example, a top surface and four circumferential side surfaces of the chassis 12 and has a substantially bathtub shape. The second cover member 21 forms, for example, a bottom surface of the chassis 12 and has a substantially flat plate shape. The hinge 14 is installed in a concave hinge arrangement groove 12*b* formed in a rear edge of the chassis 12, and connects the chassis 12 and the lid 11 to each other.

Figure 2:
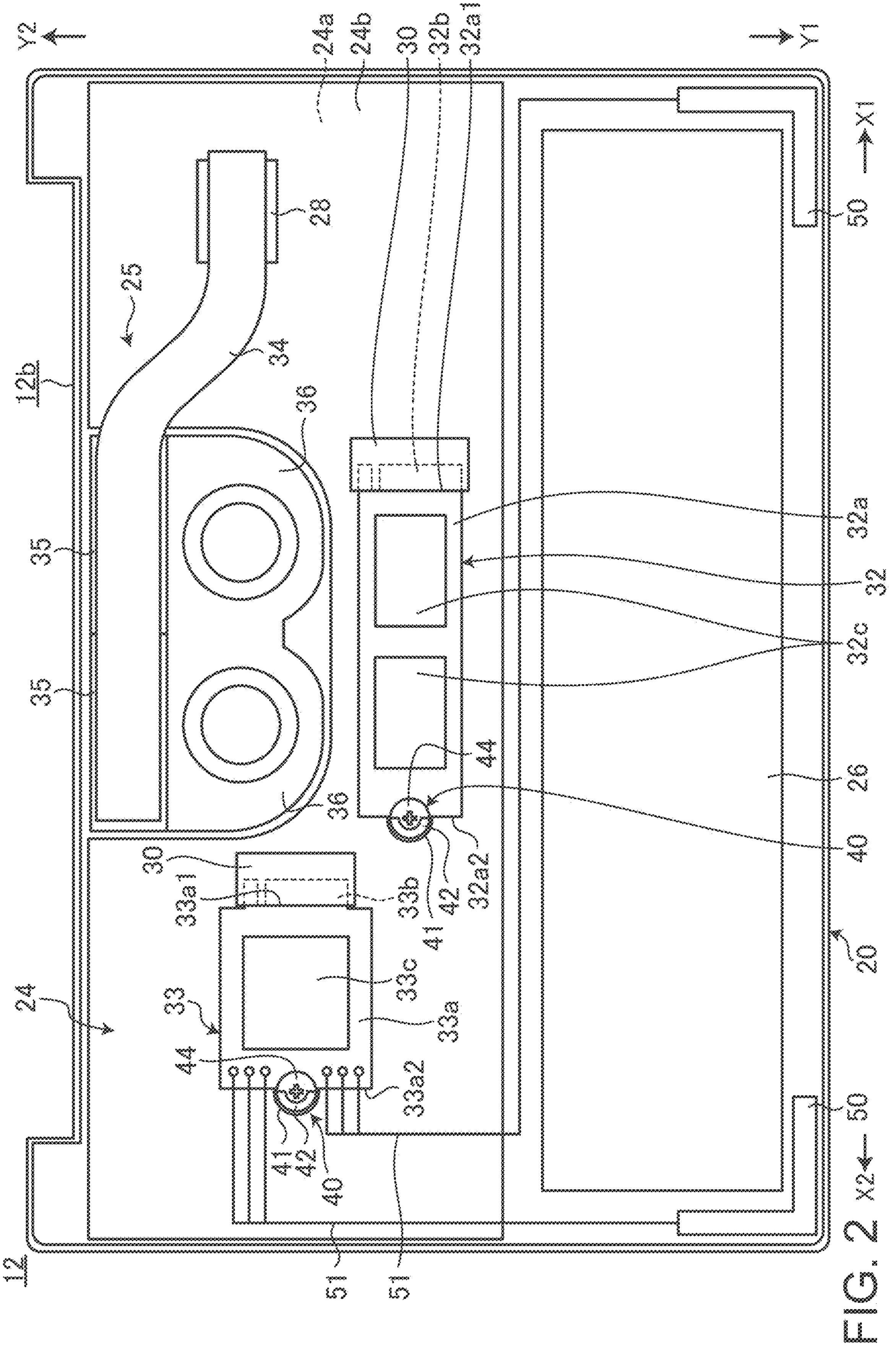
FIG. 2 is a plan view schematically illustrating an internal structure of a chassis.

FIG. 2 is a plan view schematically illustrating an internal structure of the chassis 12. FIG. 2 is a view illustrating the inside of the first cover member 20 with the second cover member 21 removed, as viewed from the lower surface side.

As illustrated in FIG. 2, a circuit board 24, a cooling module 25, and a battery device 26 are housed inside the chassis 12. Various electronic components, mechanical components, etc. are further provided inside the chassis 12.

The circuit board 24 is a printed circuit board which serves as a motherboard of the electronic apparatus 10. The circuit board 24 is arranged closer to the Y2 side of the chassis 12 and extends in the X direction. The circuit board 24 is mounted with a CPU (Central Processing Unit) 28 and a pair of connectors 30 and 30. The CPU 28 is a processing device which performs calculations related to the main control and processing of the electronic apparatus 10. The connector 30 complies with a predetermined connection standard, which is the M.2 (M dot 2) standard in one or more embodiments. Electronic modules 32 and 33 are connected to the connectors 30 respectively. Specific configurations of the circuit board 24, the electronic modules 32 and 33, and their peripheral parts will be described later. Further, various electronic components such as a GPU (Graphics Processing Unit) and a memory can be mounted on the circuit board 24. In the circuit board 24, for example, a Z1 side surface (first surface 24*a*) thereof serves as an attachment surface for the first cover member 20, and a Z2 side surface (second surface 24*b*) thereof serves as a mounting surface for the CPU 28 and the connector 30. It goes without saying that the shape, arrangement, and mounted electronic components of the circuit board 24, etc. are not limited to those described above.

The cooling module 25 can absorb heat generated by the CPU 28 and exhaust it to the outside of the chassis 12. The cooling module 25 includes a heat pipe 34, a pair of heat sinks 35 and 35, and a pair of fans 36 and 36. The cooling module 25 can transport heat from the CPU 28 to each heat sink 35 through the heat pipe 34 and promote the dissipation of heat from each heat sink 35 by blowing air from each fan 36.

The battery device 26 is a rechargeable battery which serves as a power source for the electronic apparatus 10. The battery device 26 is arranged closer to the Y1 side of the circuit board 24 and extends in the X direction.

Next, a specific configuration example of the circuit board 24 and the electronic modules 32 and 33 will be described.

First, the circuit board 24 is a printed circuit board having a predetermined conductive pattern formed on a second surface 24*b* of a plate material having insulation. The circuit board 24 may have conductive patterns formed on both surfaces 24*a* and 24*b*.

As illustrated in FIG. 2, the circuit board 24 includes a pair of connectors 30 and 30 and a pair of supporting tools 40 and 40, and supports the electronic modules 32 and 33 by the connectors 30 and the supporting tools 40 respectively. A pair of ground pads 41 and 41 each used for fixing each of the supporting tools 40 is provided on the second surface 24*b* of the circuit board 24 (refer also to FIG. 6). The ground pad 41 is formed of, for example, a circular metal pattern. The metal pattern is, for example, a copper foil printed by a silk screen. The circuit board 24 has, for example, through holes 24*c*. The ground pad 41 is formed on a peripheral edge portion of the circuit board 24 on the second surface 24*b* side.

The connector 30 is mounted on the second surface 24*b*. The implementation type of the connector 30 is not limited, but for example, a drop-in implementation type (Pcie Gen3: PCI Express 3.0) or an on-board implementation type (Pcie Gen4: PCI Express 4.0), or the like can be used.

Figure 3A:
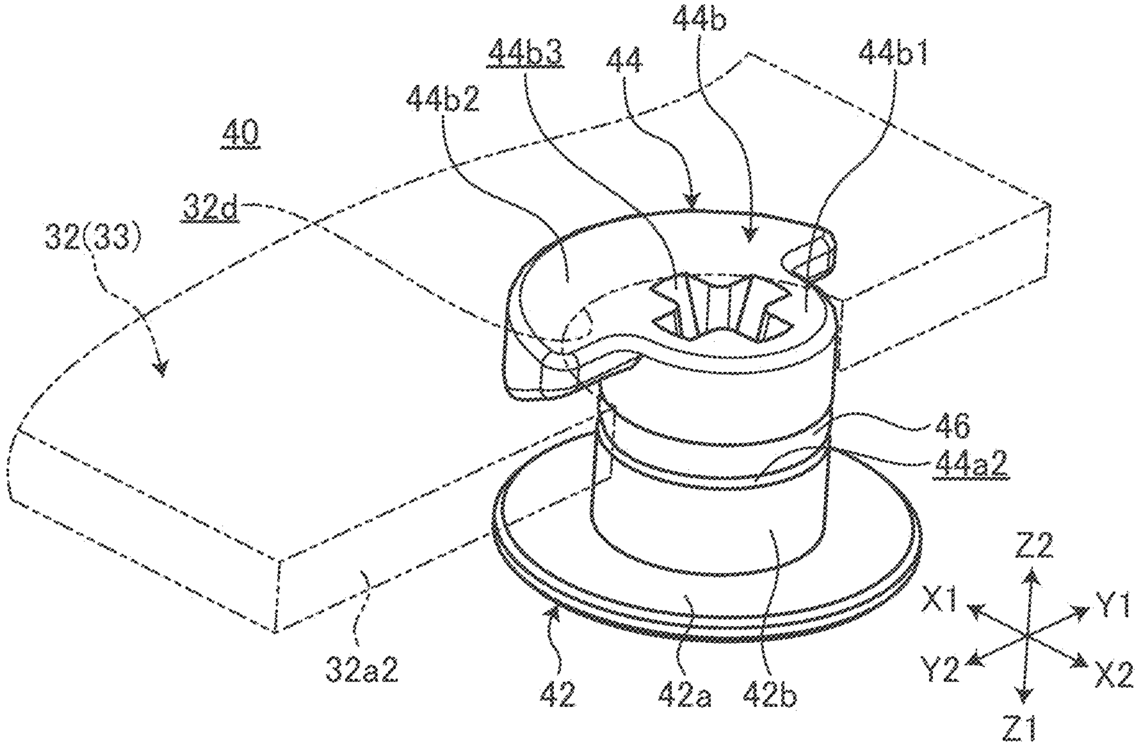
FIG. 3A is a perspective view of a supporting tool.
Figure 3B:
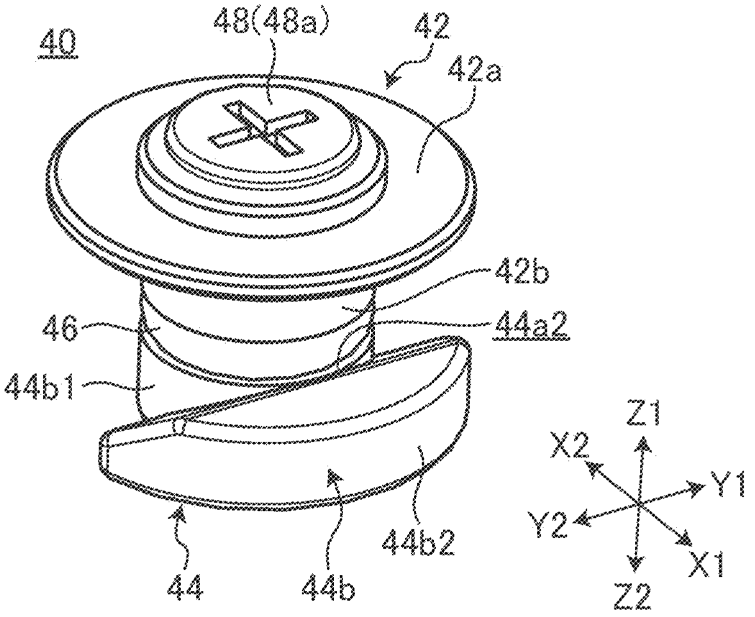
FIG. 3B is a perspective view of the supporting tool as seen from the rear side.
Figure 4:
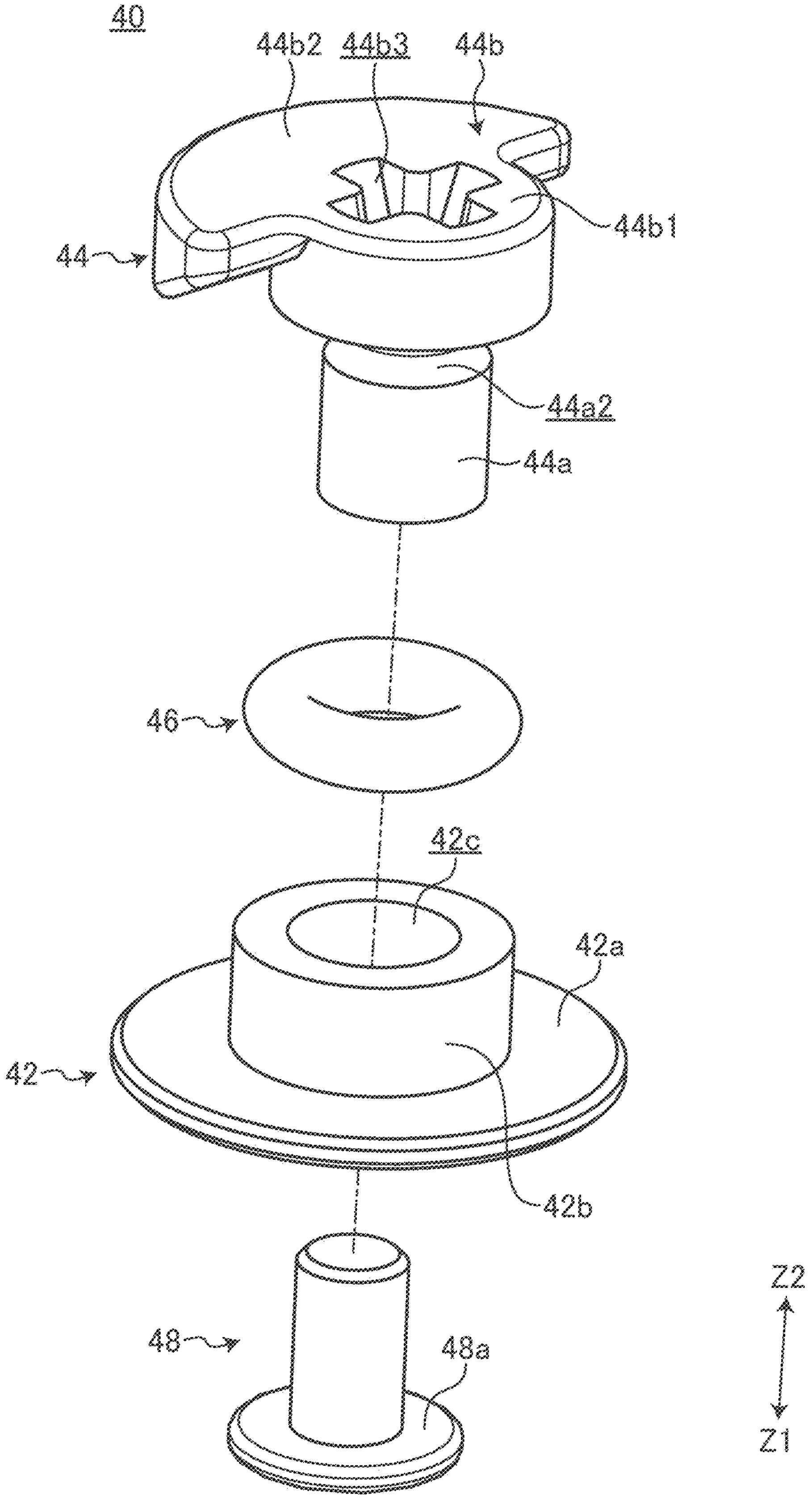
FIG. 4 is an exploded perspective view of the supporting tool.
Figure 5A:
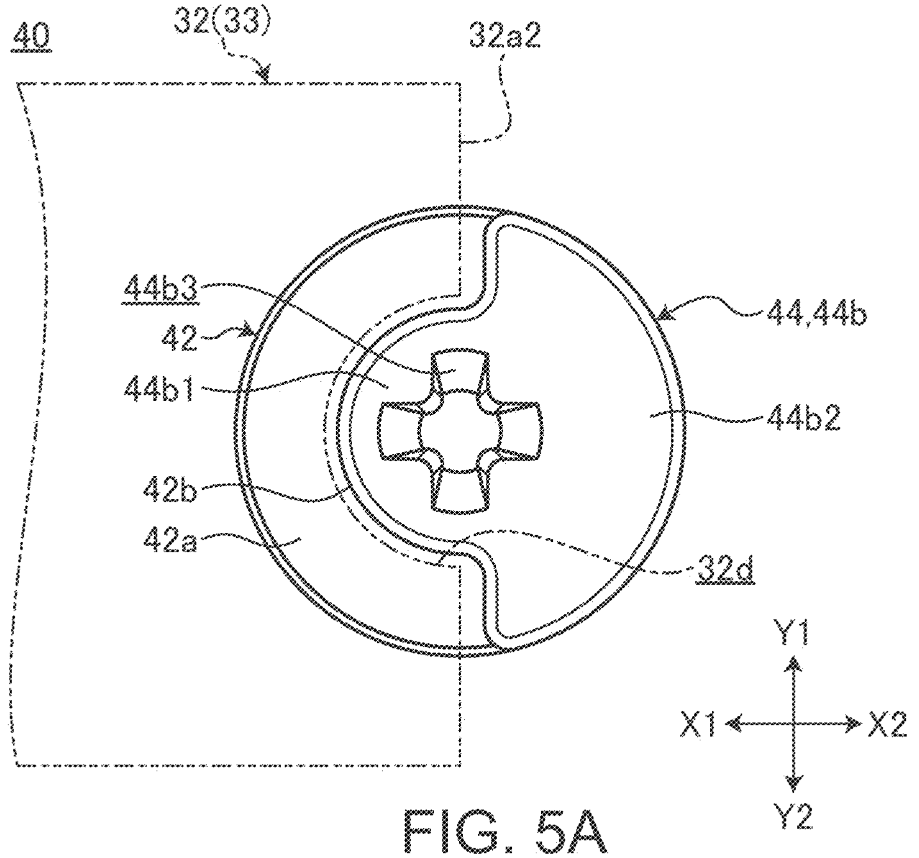
FIG. 5A is a plan view illustrating the supporting tool placed in an unlocked position.
Figure 5B:
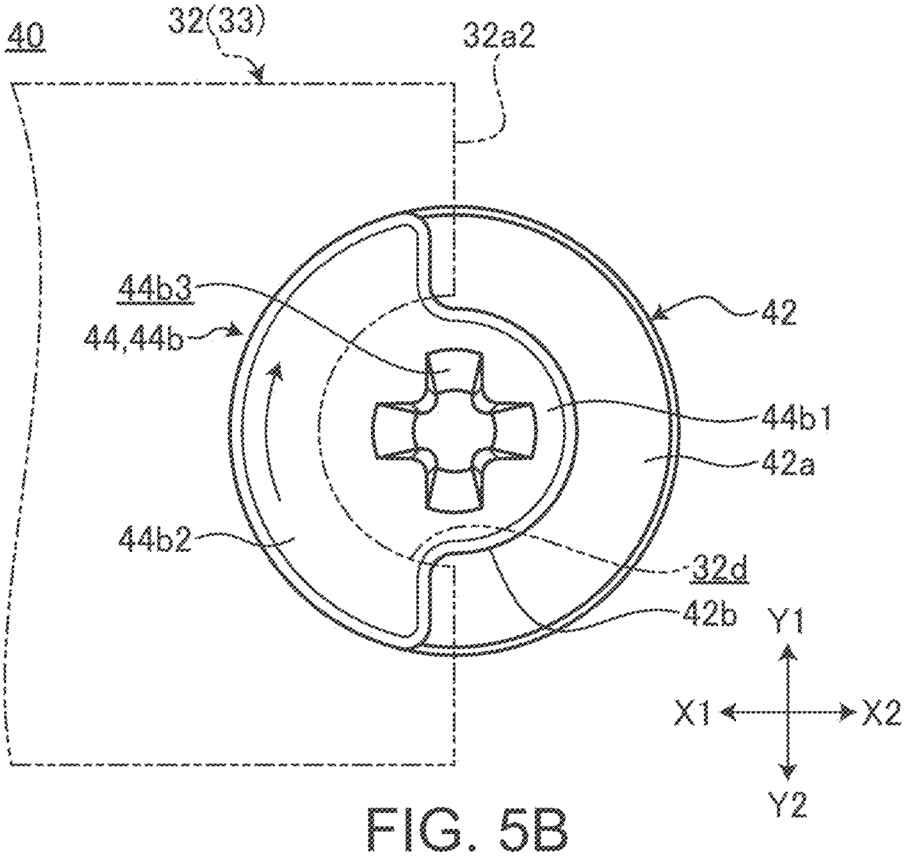
FIG. 5B is a plan view illustrating the supporting tool illustrated in FIG. 5A placed in a locked position.
Figure 6:
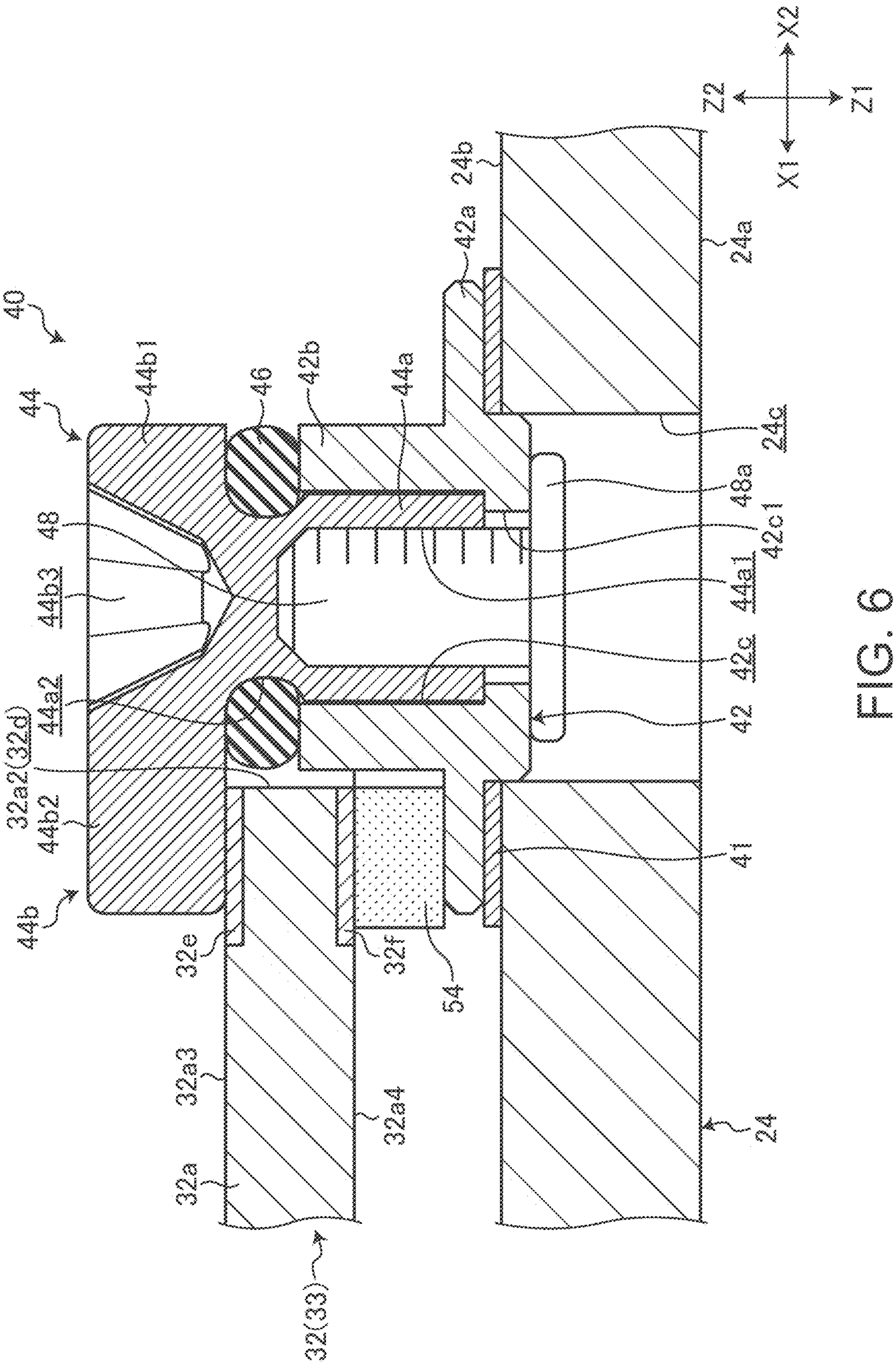
FIG. 6 is a schematic cross-sectional side view of an electronic module supported by the supporting tool.

FIG. 3A is a perspective view of the supporting tool 40. FIG. 3B is a perspective view of the supporting tool 40 as viewed from the rear side. FIG. 4 is an exploded perspective view of the supporting tool 40. FIG. 5A is a plan view of the supporting tool 40 placed in an unlocked position. FIG. 5B is a plan view of the supporting tool 40 illustrated in FIG. 5A placed in a locked position. FIG. 6 is a schematic cross-sectional side view of the electronic module 32 (33) supported by the supporting tool 40. A configuration in which one electronic module 32 is supported by the supporting tool 40 will be representatively described here. Since a configuration in which the other electronic module 33 is supported by the supporting tool 40 can be made the same as or similar to that for the electronic module 32, a detailed description thereof will be omitted.

As illustrated in FIGS. 3A to 6, the supporting tool 40 includes a stud member 42, a lock member 44, and a resistance member 46. The supporting tool 40 is a lock component which can be switched between a locked position (close position) in which the electronic module 32 can be supported and an unlocked position (open position) by inverting the cam-shaped lock member 44 180 degrees. The rotation angle required for switching the lock member 44 between the locked position and the unlocked position may be other than 180 degrees, for example, 90 degrees or the like.

The stud member 42 is a metal component having a flange 42*a* and a protruding portion 42*b*.

The flange 42*a* is a metal disk. The protruding portion 42*b* is formed integrally with the flange 42*a* and is a cylindrical body which stands upright in the Z direction from the center of the flange 42*a*. The protruding portion 42*b* is provided with a hole 42*c* extending along the protruding direction about its axis. The hole 42*c* passes through the stud member 42 in the axial direction (Z direction). The hole 42c is, for example, a stepped hole whose inner diameter changes in two steps. The hole 42c has a portion from the Z2 side opening to the inside of the flange 42a which is larger in diameter than a portion from the Z1 side opening to the flange 42a as viewed in the axial direction (refer to FIG. 6). Consequently, a flange-like edge portion 42cl whose inner circumferential surface is reduced in diameter is formed at the Z1 side end of the hole 42c.

The lock member 44 is a metal component having a shaft portion 44a and a plate portion 44b. The stud member 42 and the lock member 44 may be formed of, for example stainless steel, steel, aluminum, copper, or brass, etc.

The shaft portion 44a is a rotating shaft which is inserted into the hole 42c from the Z2 side opening. The shaft portion 44a is inserted into the hole 42c without any rattle and so as to be capable of relative rotation. The shaft portion 44a protrudes from the Z2 side surface of the plate portion 44b. The shaft portion 44a is formed with a screw hole 44a1 extending along the axial direction (Z direction). The screw hole 44al has a female screw formed on its inner circumferential surface. The screw hole 44al opens at the tip surface (Z1 side end surface) of the shaft portion 44a. An annular groove 44a2 is formed in an outer circumferential surface of the shaft portion 44a along the circumferential direction. The groove 44a2 has a substantially doughnut-shaped groove formed by having a shape obtained by cutting the outer circumferential surface of the shaft portion 44a in an arc shape. The groove 44a2 is formed at the base portion of the shaft portion 44a relative to the plate portion 44b.

The plate portion 44b is integrally formed at a base end of the shaft portion 44a. The plate portion 44b is rotatable together with the shaft portion 44a around the axis of the protruding portion 42b. The plate portion 44b has, for example, a shape in which two semicircular metal plates (semicircular plates 44b1 and 44b2) having different outer diameters are joined together. Thus, the plate portion 44b has a substantially cam-like or mushroom-like shape in a plan view. The shaft portion 44a is formed so as to protrude from the small diameter semicircular plate 44b1 toward the Z1 side. An operation hole 45b3 is formed in the center of the semicircular plate 44b1. The operation hole 44b3 is a cross-shaped hole into which a tool such as a plus driver is fitted and which is used when operating the lock member 44 to rotate. The large diameter semicircular plate 44b2 is provided so as to protrude from the outer circumferential surface of the shaft portion 44a in a plan view. Thus, when the lock member 44 is operated to rotate relative to the stud member 42, the large diameter semicircular plate 44b2 turns around the axis of the shaft portion 44a (refer to FIGS. 5A and 5B).

The lock member 44 has a screw 48 tightened into the screw hole 44a1 of the shaft portion 44a inserted into the hole 42c of the stud member 42. The screw 48 is passed through the hole 42c from the rear side of the flange 42a. An edge 42cl is sandwiched between a head 48a of the screw 48 and the tip surface of the shaft portion 44a. A plate thickness of the edge 42cl is slightly shorter than the distance between the head 48a of the screw 48 fastened in the screw hole 44al and the tip surface (Z1 side end surface) of the shaft portion 44a. Consequently, the lock member 44 is supported relative to the stud member 42 so as to be rotatable relative thereto without rattling and in a come-off prevented state.

The resistance member 46 constitutes a torque generating portion which imparts a rotational torque to the rotation of the lock member 44. The resistance member 46 is, for example, an O-ring. The resistance member 46 is fitted into the groove 44a2 of the shaft portion 44a and attached to the outer circumferential surface of the shaft portion 44a. The resistance member 46 is sandwiched between the Z1 side surface of the plate portion 44b and the Z2 side end surface of the protruding portion 42b and is brought into close contact with both. This allows the resistance member 46 to generate a rotational resistance due to friction between the lock member 44 and the protruding portion 42b.

As illustrated in FIG. 6, the resistance member 46 comes into close contact with the inner circumferential surface of the groove 44a2 and the Z1 side surface of the plate portion 44b relative to the lock member 44. The resistance member 46 is in close contact with the stud member 42 only at a tip surface of the protruding portion 42b. Thus, the contact area of the resistance member 46 with the lock member 44 is significantly larger than the contact area thereof with the stud member 42. That is, the frictional resistance between the resistance member 46 and the lock member 44 is larger than that between the resistance member 46 and the stud member 42. Therefore, when the lock member 44 rotates relative to the stud member 42, the resistance member 46 comes into close contact with the lock member 44 and rotates integrally therewith, with the Z1 side surface sliding against the tip surface of the protruding portion 42b. This prevents the resistance member 46 from sliding against both the lock member 44 and the protruding portion 42b, and prevents a situation in which no frictional resistance is substantially generated. As a result, the supporting tool 40 can more reliably generate a rotational torque between the lock member 44 and the protruding portion 42b.

Next, the electronic modules 32 and 33 are card-type module components which can be connected to the connector 30 which complies with the M.2 standard as described above.

The electronic module 32 is, for example, a storage device. The electronic module 32 of one or more embodiments is an SSD (solid state drive). As illustrated in FIG. 2, the electronic module 32 includes a module substrate 32a, a terminal 32b formed on one end 32al of the module substrate 32a, and a semiconductor chip 32c mounted on the module substrate 32a. With the terminal 32b of the electronic module 32 connected to the connector 30, the other end 32a2 of the module substrate 32a is pressed in the Z direction by the supporting tool 40. Thus, the electronic module 32 is attached to the circuit board 24. A semicircular notch 32d into which the protruding portion 42b of the stud member 42 can be arranged is formed in the longitudinal center of the other end 32a2 (refer to FIG. 4).

Ground portions 32e and 32f are provided on one surface 32a3 and the other surface 32a4 of the module substrate 32a, respectively (refer to FIG. 6). The ground portions 32e and 32f are metal patterns provided on a peripheral edge portion of the notch 32d, and are, for example, a copper foil printed by silk screen.

The electronic module 33 is, for example, a communication module. The electronic module 33 of one or more embodiments is compatible with a WWAN (Wireless Wide Area Network). The communication standard supported by the electronic module 33 may be, for example, a WLAN (Wireless Local Area Network) or the like. As illustrated in FIG. 2, the electronic module 33 has a module substrate 33a, a terminal 33b formed on one end 33al of the module substrate 33a, and a semiconductor chip 33c mounted on the module substrate 33a. In the electronic module 33, with the terminal 33b thereof connected to the connector 30, the other end 33a2 of the module substrate 33a is pressed in the Z direction by the supporting tool 40. Thus, the electronic module 33 is attached to the circuit board 24. A cable 51 extending from an antenna element 50 provided at each location on the chassis 12 and the lid 11 is connected to the other end 33*a*2 of the electronic module 33 as appropriate.

The electronic module 33 is different from the electronic module 32 in function, size, etc., but a structure for mounting the electronic module 33 on the circuit board 24 can be made the same or similar. Therefore, the other end 33*a*2 of the electronic module 33 is also provided with a notch similar to the notch 32*d* of the electronic module 32. Further, ground portions similar to the ground portions 32*e* and 32*f* of the module substrate 32*a* are provided on one and the other surfaces of the module substrate 33*a*, respectively.

Next, a method of assembling the supporting tool 40 and a method of supporting the electronic modules 32 and 33 by the supporting tool 40 will be described. The method of supporting one electronic module 32 will be described representatively even here, but the method of supporting the other electronic module 33 can also be made the same or similar.

As illustrated in FIGS. 2 and 6, the supporting tool 40 is fixed to the ground pad 41. In the supporting tool 40, for example, the bottom of the stud member 42 is inserted into the through hole 24*c*, and the flange 42*a* is placed on the ground pad 41, followed by a reflow soldering process. Consequently, the stud member 42 is fixed to the ground pad 41 and mounted on the circuit board 24. The stud member 42 can be fixed at the same time as the process of mounting the connector 30 and other mounting components to the circuit board 24 by reflow soldering, for example.

Subsequently, a gasket 54 which is a conductive member is passed over an outer circumferential surface of the protruding portion 42*b*. The gasket 54 is, for example, a cushioning material having electrical conductivity. The gasket 54 has, for example, a predetermined thickness and is formed in a substantially C-shape. The gasket 54 is arranged on the Z2 side of the flange 42*a* so as to grip the protruding portion 42*b*.

Next, the shaft portion 44*a* of the lock member 44 with the resistance member 46 fitted in the groove 44*a*2 is inserted into the hole 42*c* of the protruding portion 42*b*. The screw 48 is fastened into the screw hole 44*a*1 to prevent the lock member 44 from coming off the stud member 42. Consequently, the supporting tool 40 is attached to the circuit board 24.

It is also possible for the O-ring constituting the resistance member 46 to use a material made of a heat-resistant material capable of withstanding the temperature of the reflow soldering process. Then, with the lock member 44 of the supporting tool 40 connected to the stud member 42 by the screw 48 in advance, the stud member 42 can be mounted on the circuit board 24 by reflow soldering as it is. This improves the manufacturing efficiency of the circuit board 24. The gasket 54 may be installed after the supporting tool 40 is mounted on the circuit board 24.

When mounting the electronic module 32 on the circuit board 24 of one or more embodiments, the lock member 44 of the supporting tool 40 is placed in the unlocked position as illustrated in FIG. 5A. The unlocked position is a position where the large diameter semicircular plate 44*b*2 of the lock member 44 faces the opposite side (X2 side) from the electronic module 32 side (X1 side). At this time, since the lock member 44 receives a rotational torque from the resistance member 46, it can be reliably held in the unlocked position. Then, after the terminal 32*b* is connected to the connector 30, the other end 32*a*2 is placed immediately besides the supporting tool 40 which is at the unlocked position. In doing so, the notch 32*d* is arranged so as to surround half of the outer circumferential surface of the protruding portion 42*b*, and at the same time, the gasket 54 is sandwiched between the ground portion 32*f* of the other surface 32*a*4 and the flange 42*a*.

Next, as illustrated in FIG. 5B, the lock member 44 is rotated with a predetermined tool or the like to the locked position. The lock position is a position where the large diameter semicircular plate 44*b*2 of the lock member 44 faces the electronic module 32 side (X1 side). At this time, the lock member 44 receives a rotational torque from the resistance member 46. Therefore, the lock member 44 can be smoothly rotated from the unlocked position to the locked position with an appropriate rotational torque, so that high operability is obtained. Thus, the electronic module 32 is attached to the circuit board 24 with one end 32*al* connected to the connector 30 and the other end 32*a*2 supported by the supporting tool 40. In this case as well, the lock member 44 receives a rotational torque from the resistance member 46, so that the lock member 44 can be reliably held in the locked position. In this way, the circuit board 24 can easily support the electronic module 32 using the supporting tool 40, thereby resulting in high work efficiency.

As illustrated in FIG. 6, when the electronic module 32 is attached to the circuit board 24, the plate portion 44*b* of the lock member 44 comes into contact with the ground portion 32*e* on the one surface 32*a*3 and is electrically connected thereto. The ground portion 32*f* on the other surface 32*a*4 of the electronic module 32 is electrically connected to the flange 42*a* via the gasket 54. This allows the supporting tool 40 to reliably establish electrical connection between the ground portions 32*e* and 32*f* and the ground pad 41 of the circuit board 24. The electronic module 32 may have a single-sided ground structure having no ground portion 32*f* on the other surface 32*a*4, for example. In this case, the gasket 54 may be omitted.

When detaching the electronic module 32 from the circuit board 24, the lock member 44 is rotated with a predetermined tool or the like to the unlocked position illustrated in FIG. 5A. Then, the electronic module 32 is released from the pressure applied by the lock member 44. As a result, the electronic module 32 receives a biasing force at the connection between the connector 30 and the terminal 32*b* and a repulsive force from the gasket 54, and the other end 32*a*2 rises to the Z2 side with the one end 32*al* as a pivot point. This allows easy removal of the electronic module 32 from the circuit board 24.

As described above, the circuit board 24 of one or more embodiments is mounted with the supporting tool 40 which supports the other end 32*a*2 (33*a*2) of the electronic module 32 (33) on the side opposite to the connector 30 side. The supporting tool 40 includes the stud member 42 having the flange 42*a* fixed to the circuit board 24 and the protruding portion 42*b* standing upright from the flange 42*a*. The supporting tool 40 further includes the lock member 44 which is supported rotatably relative to the protruding portion 42*b* and is switchable between the locked position where it presses the other end 32*a*2 (33*a*2) of the electronic module 32 (33) and the unlocked position where it does not press the other end 32*a*2 (33*a*2), and the resistance member 46 which constitutes the torque generating portion that imparts the rotational torque to the rotation of the lock member 44.

Therefore, the circuit board 24 and the electronic apparatus 10 mounted therewith do not require the screws for supporting the electronic modules 32 and 33 on the circuit board 24, thereby improving the operability of the attachment/detachment of the electronic modules 32 and 33. In particular, in the case of the electronic apparatus 10 such as the laptop PC, the electronic modules 32 and 33 may be replaced not only during work in a factory or the like, but also by the user himself or herself. Even in this case, the electronic apparatus 10 can reduce the risk of screws falling off or getting lost, thereby further improving maintainability and expandability.

Further, the supporting tool 40 applies the rotational torque to the rotation of the lock member 44. Therefore, the lock member 44 can be stably held in either of the rotational positions: the locked position and the unlocked position. By holding the lock member 44 in the locked position, the supporting tool 40 further improves the operability of the attachment/detachment of the electronic modules 32 and 33. By holding the lock member 44 in the unlocked position, the supporting tool 40 can support the electronic modules 32 and 33 further stably. This is because, even if the circuit board 24 receives an impact due to, for example, the electronic apparatus 10 being dropped, and the like, the lock member 44 is suppressed from erroneously rotating to the unlocked position.

In the supporting tool 40, the lock member 44 is prevented from coming off the stud member 42 by the screw 48 being fastened from the rear side of the flange 42*a* to the tip end of the shaft portion 44*a* inserted into the hole 42*c*. As described above, the electronic modules 32 and 33 may be attached and detached by the user himself or herself. For this reason, the supporting tool 40 may suffer defects such as the operation hole 44*b*3 of the lock member 44 being damaged by a tool or the resistance member 46 serving as the O-ring being cut. At this time, in the supporting tool 40, the lock member 44 can be easily attached and detached from the stud member 42 by operating the screw 48. Therefore, in the circuit board 24 and the electronic apparatus 10, when the malfunction occurs in the supporting tool 40 as described above, it is not necessary to replace the entire circuit board 24 on which the stud member 42 is mounted. Thus, the circuit board 24 and the electronic apparatus 10 are high in maintainability and low in maintenance cost as well.

Figure 7:
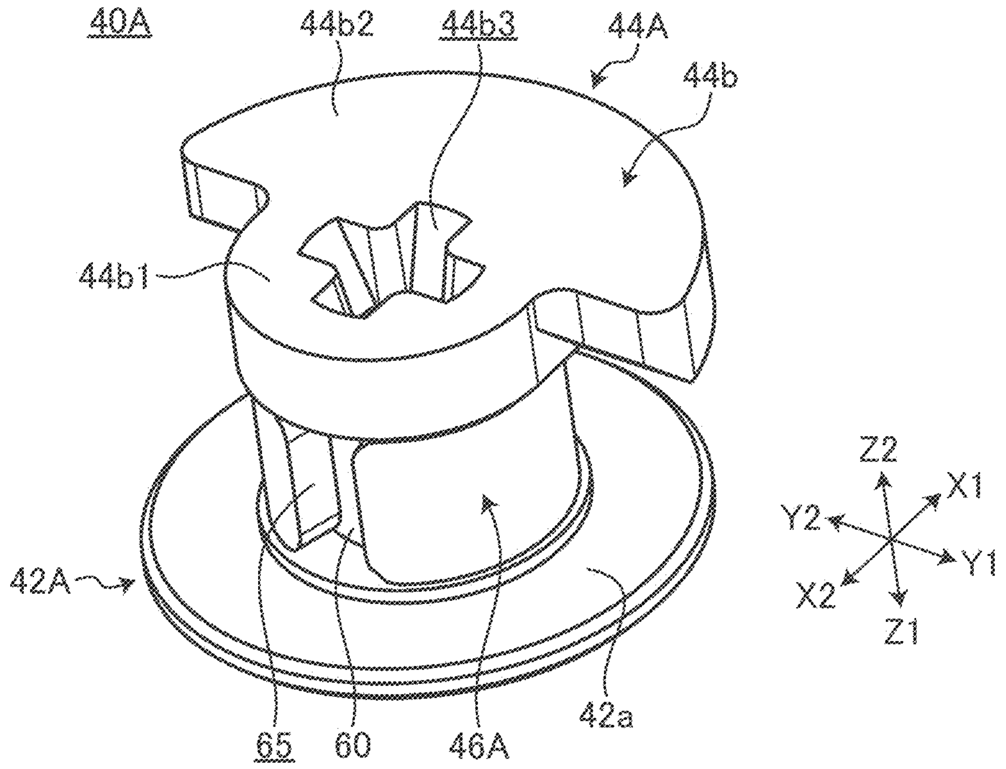
FIG. 7 is a perspective view of a supporting tool according to a first modification.
Figure 8:
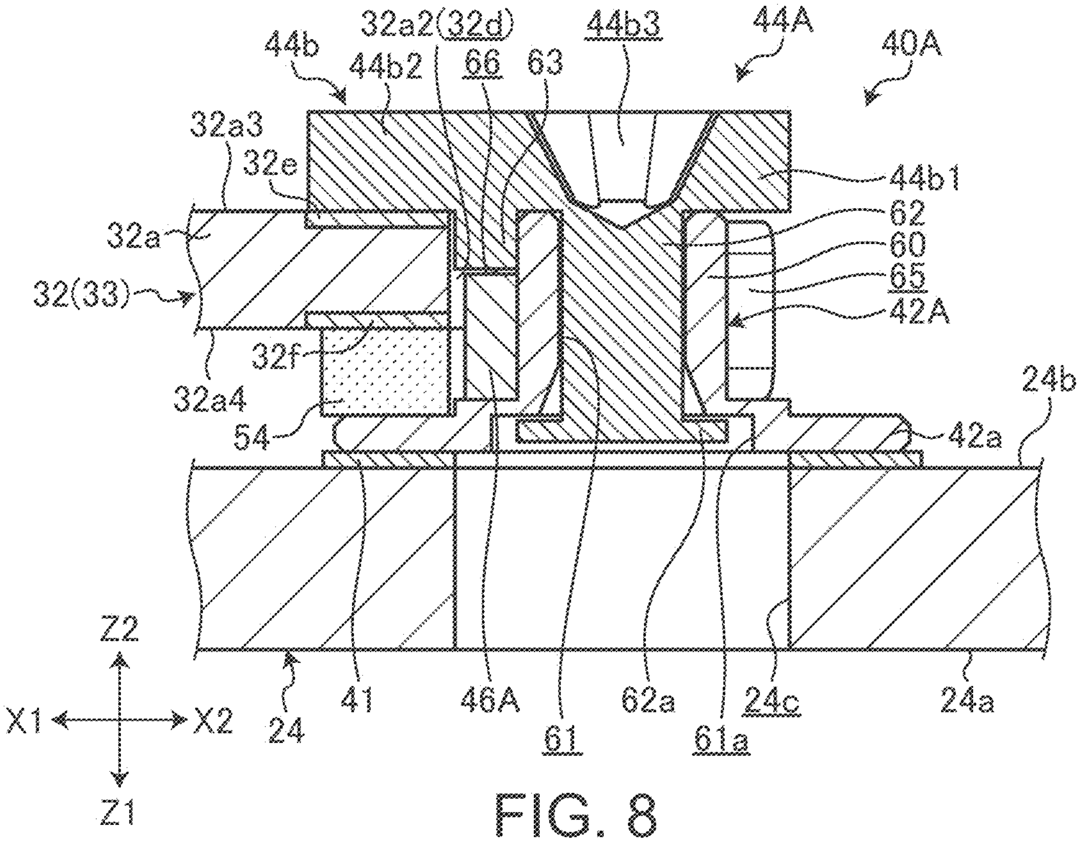
FIG. 8 is a schematic cross-sectional side view of an electronic module supported by the supporting tool illustrated in FIG. 7.
Figure 9:
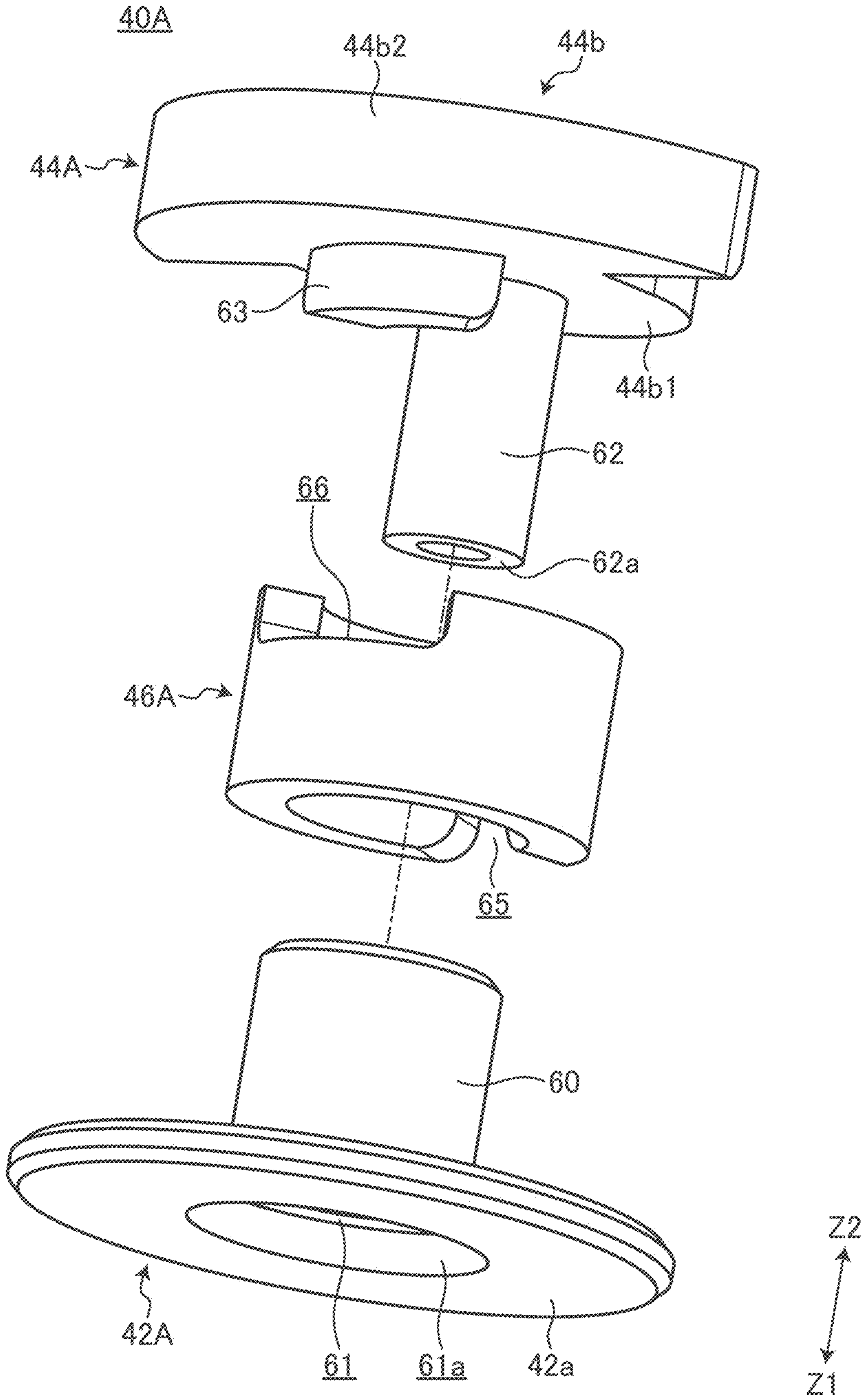
FIG. 9 is an exploded perspective view of the supporting tool illustrated in FIG. 7.

FIG. 7 is a perspective view of a supporting tool 40A according to a first modification. FIG. 8 is a schematic cross-sectional side view of the electronic module 32 (33) supported by the supporting tool 40A illustrated in FIG. 7. FIG. 9 is an exploded perspective view of the supporting tool 40A illustrated in FIG. 7. In FIGS. 7 to 9, the same reference symbols as those illustrated in FIGS. 1 to 6 indicate the same or similar configurations. Therefore, detailed description thereof is omitted as they have the same or similar functions and effects, and the same applies to the subsequent FIGS. 10A to 14.

The supporting tool 40A illustrated in FIGS. 7 to 9 includes a stud member 42A, a lock member 44A, and a resistance member 46A which are different in configuration from the stud member 42, the lock member 44, and the resistance member 46 of the supporting tool 40 illustrated in FIGS. 3A to 6.

The stud member 42A has a protruding portion 60 and a hole 61. The protruding portion 60 is smaller in outer diameter than the protruding portion 42*b*. The protruding portion 60 does not have a groove 44*a*2 on its outer circumferential surface. The hole 61 is different in shape from the hole 42*c*. The hole 61 has a counterbore portion 61*a* in which the inner diameter of a portion which opens to the Z1 side surface is more expanded than that of the other portion.

The lock member 44A has a shaft portion 62 smaller in outer diameter than the shaft portion 44*a*. The shaft portion 62 has a cylindrical shape and is not formed with the screw hole 44*a*1. As illustrated in FIG. 9, before the lock member 44A is connected to the stud member 42A, the tip end (Z2 side end) of the shaft portion 62 is formed with an upright wall 62*a*. The upright wall 62*a* is a cylindrical wall portion having a shallow recess formed in the center. As illustrated in FIG. 8, after the shaft portion 62 is inserted into the hole 61, the upright wall 62*a* is deformed by crimping to become a crimped portion 62*a*. The crimped portion 62*a* replaces the screw 48. In other words, the crimped portion 62*a* prevents the lock member 44A from coming off while allowing the lock member 44A to rotate relatively to the stud member 42A. The lock member 44A has a stopper protrusion 63 on the rear surface (Z1 side surface) of the semicircular plate 44*b*2 of the plate portion 44*b*. The stopper protrusion 63 is, for example, an arc-shaped upright wall.

The resistance member 46A constitutes a torque generating portion which imparts a rotational torque to the rotation of the lock member 44A. Unlike the resistance member 46 constituted by the O-ring, the resistance member 46A is a leaf spring formed from a metal plate into a C-ring shape. The resistance member 46A has an opening 65 and a stopper recess 66.

The opening 65 corresponds to the opening of the letter C. The inner diameter of the resistance member 46A is smaller than the outer diameter of the shaft portion 62. The resistance member 46A can be fitted on the outer circumferential surface of the shaft portion 62 by elastically deforming it so as to open the C-shape through the opening 65. Thus, the resistance member 46A is attached to the outer circumferential surface of the shaft portion 62 so as to be capable of relative rotation with a predetermined rotational torque.

The stopper recess 66 is a notched recess formed in the Z2 side end surface of the resistance member 46A. The stopper recess 66 is located on the opposite side to the opening 65 in the diameter direction of the resistance member 46A. The stopper recess 66 is fitted with the stopper protrusion 63 of the lock member 44A. This allows the lock member 44A to rotate integrally with the resistance member 46A relative to the outer circumferential surface of the protruding portion 60 of the stud member 42A.

Next, a method of attaching the supporting tool 40A and a method of supporting the electronic modules 32 and 33 by the supporting tool 40A will be described.

As illustrated in FIG. 8, even in the supporting tool 40A, a method of fixing the stud member 42A to the ground pad 41 and mounting the same on the circuit board 24 can be performed in the same manner as in the case of the supporting tool 40 described above.

First, in the supporting tool 40A, the resistance member 46A is fitted on the outer circumferential surface of the protruding portion 60 of the stud member 42A. Then, the shaft portion 62 of the lock member 44A is inserted into the hole 61. At this time, the stopper protrusion 63 is fitted into the stopper recess 66. Next, the upright wall 62*a* at the tip of the shaft portion 62 passing through the hole 61 is subjected to crimping to form the crimped portion 62*a*. Thus, the lock member 44A is prevented from coming off the stud member 42A, and the assembly of the supporting tool 40A is completed. The entire supporting tool 40A is constituted of a metal member. Therefore, after the lock member 44A is assembled into the stud member 42A, the supporting tool 40A can also be easily mounted on the circuit board 24 by reflow soldering.

Since the method of supporting the electronic modules 32 and 33 by the supporting tool 40A can be performed in the same manner as the method of supporting the electronic modules 32 and 33 by the supporting tool 40 illustrated in FIGS. 5A and 5B, detailed description thereof will be omitted. That is, in the case of the supporting tool 40A as well, the lock member 44A can be rotated from the unlocked position to the locked position while receiving a rotational torque from the resistance member 46A. Therefore, even in the circuit board 24 equipped with the supporting tool 40A and the electronic apparatus 10, the workability of attaching and detaching the electronic modules 32 and 33 is improved, and the electronic modules can be supported stably.

In the supporting tool 40A as well, the screw 48 can be used in place of the crimped portion 62*a*. Further, even in the above-described supporting tool 40A and supporting tools 40B to 40D to be described later, the crimped portion 62*a* can be used in place of the screw 48. The configuration in which the screw 48 is used, allows the lock member 44 and the like to be easily replaced even if the crimped portion 62*a* is damaged.

Figure 10A:
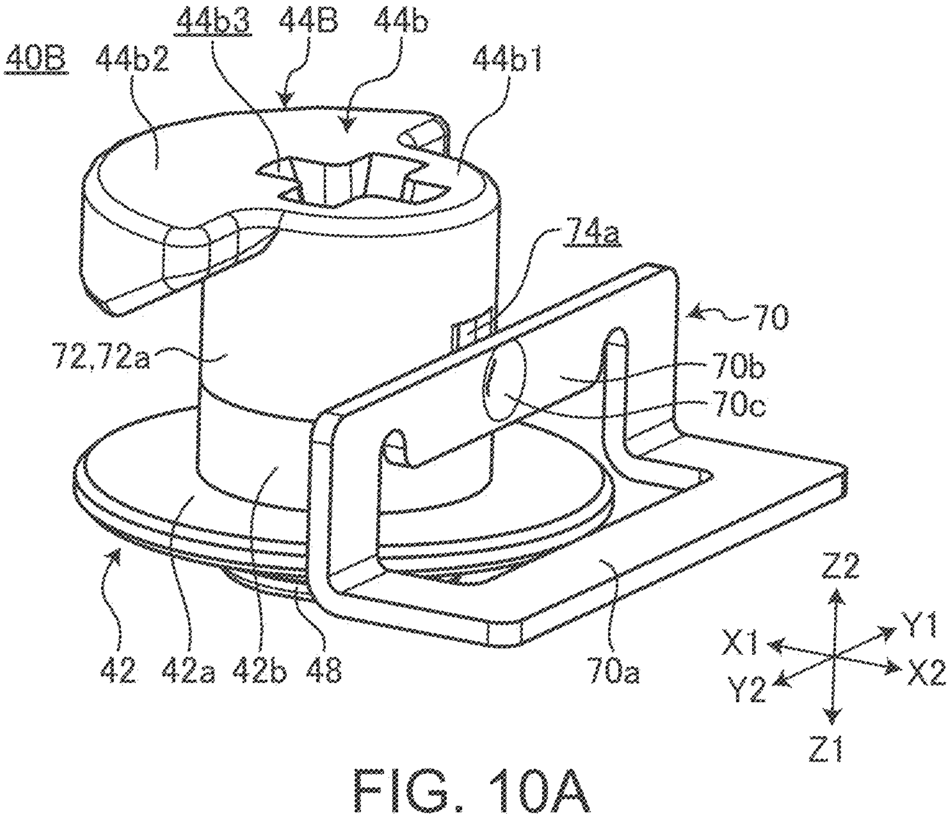
FIG. 10A is a perspective view of a supporting tool and a positioning member according to a second modification.
Figure 10B:
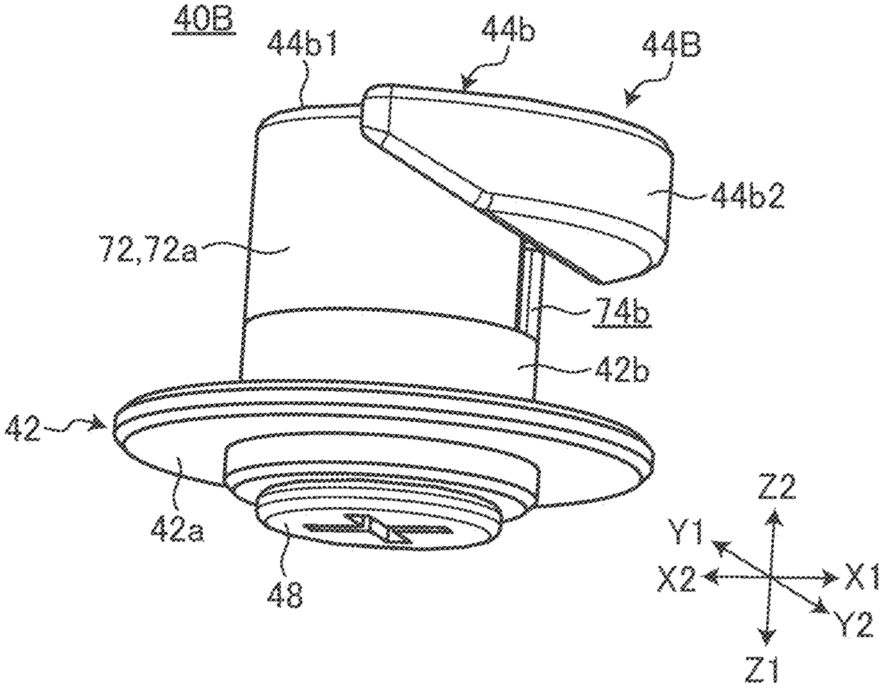
FIG. 10B is a perspective view of the supporting tool illustrated in FIG. 10A when viewed from a different angle.
Figure 11A:
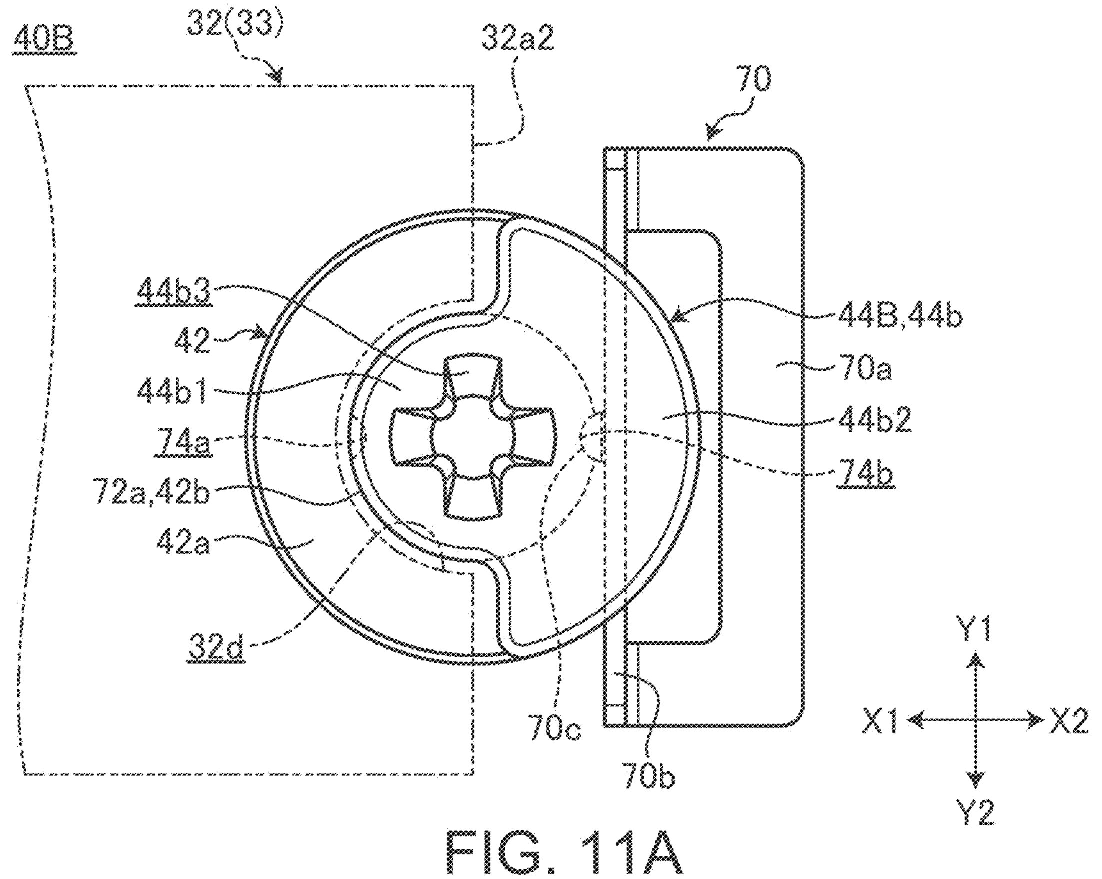
FIG. 11A is a plan view of the supporting tool illustrated in FIG. 10A placed in an unlocked position.
Figure 11B:
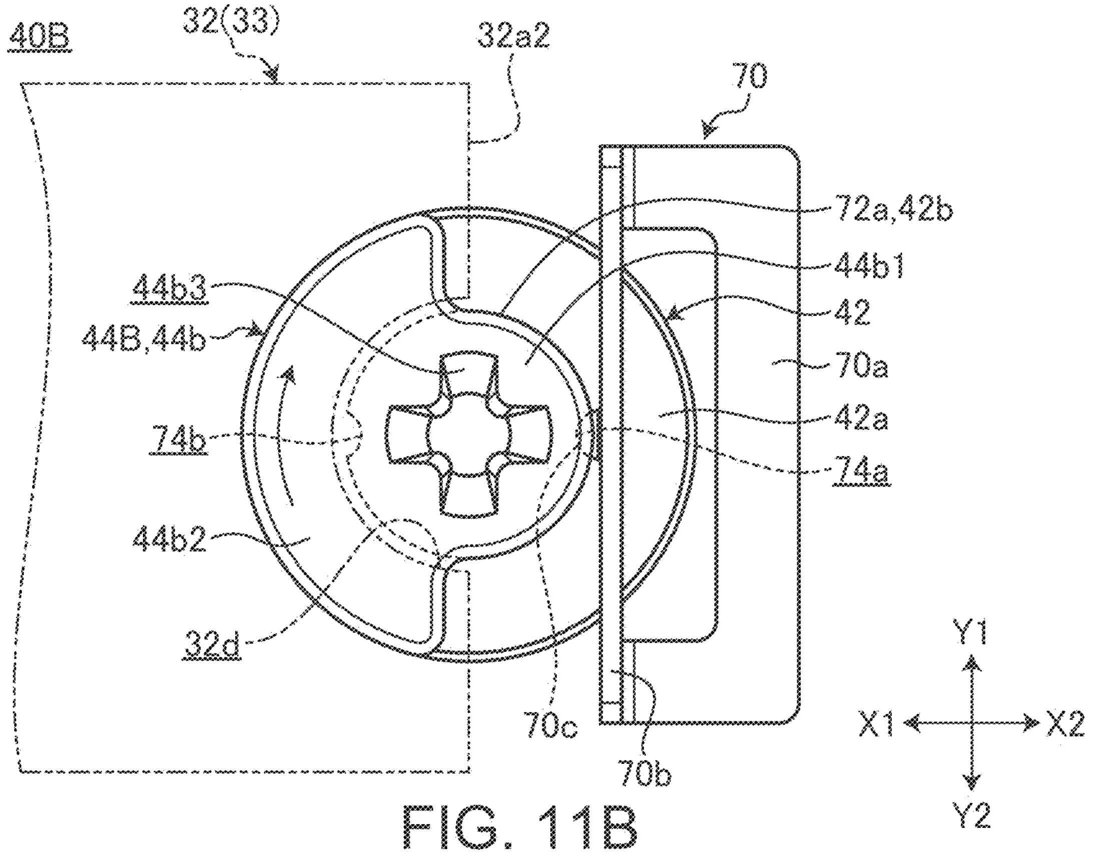
FIG. 11B is a plan view of the supporting tool illustrated in FIG. 11A placed in a locked position.
Figure 12:
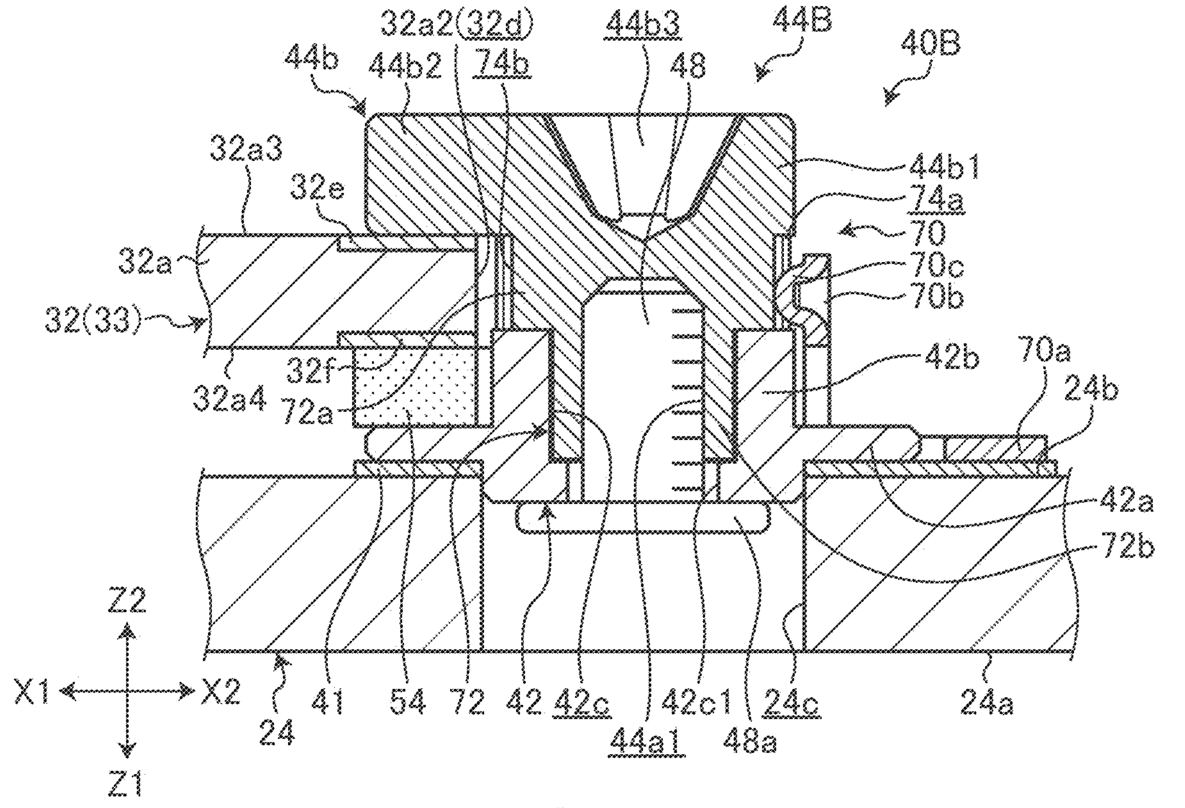
FIG. 12 is a schematic cross-sectional side view of an electronic module supported by the supporting tool illustrated in FIG. 10A.

FIG. 10A is a perspective view of the supporting tool 40B and a positioning member 70 according to a second modification. FIG. 10B is a perspective view of the supporting tool 40B illustrated in FIG. 10A when viewed from a different angle. FIG. 11A is a plan view of the supporting tool 40B illustrated in FIG. 10A placed in an unlocked position. FIG. 11B is a plan view of the supporting tool 40B illustrated in FIG. 11A placed in a locked position. FIG. 12 is a schematic cross-sectional side view of the electronic module 32 (33) supported by the supporting tool 40B illustrated in FIG. 10A.

The supporting tool 40B illustrated in FIGS. 10A to 12 includes a lock member 44B different in configuration from the lock member 44 of the supporting tool 40 illustrated in FIGS. 3A to 6. The supporting tool 40B is used together with the positioning member 70.

The lock member 44B has a shaft portion 72 different in configuration from the shaft portion 44*a*. The shaft portion 72 is a stepped shaft having a large diameter portion 72*a* on the Z2 side and a small diameter portion 72*b* on the Z1 side. The large diameter portion 72*a* is formed to have the same diameter as the semicircular plate 44*b*1 of the plate portion 44*b*, and protrudes in the Z1 direction so as to be continuous from the semicircular plate 44*b*1. The small diameter portion 72*b* is a portion which has the same diameter as the shaft portion 44*a*, and is inserted into the hole 42*c* of the stud member 42.

The shaft portion 72 does not have a groove 44*a*2 on its outer circumferential surface. The shaft portion 72 has a pair of recesses 74*a* and 74*b* formed on the outer circumferential surface of the large diameter portion 72*a*. The recesses 74*a* and 74*b* are vertical grooves extending in the axial direction (Z direction) of the large diameter portion 72*a*. The recesses 74*a* and 74*b* are disposed on the outer circumferential surface of the shaft portion 72 on the sides 180 degrees opposite to each other. With the diameter direction of the large diameter portion 72*a* as the reference, the recess 74*a* is arranged on the side of the small diameter semicircular plate 44*b*1, and the recess 74*b* is arranged on side of the large diameter semicircular plate 44*b*2.

The positioning member 70 is a sheet metal part formed into a substantially L-shape in a side view. The positioning member 70 is mounted on the second surface 24*b* of the circuit board 24, and selectively positions the lock member 44B between the locked position and the unlocked position by coming into contact with the lock member 44B. The positioning member 70 has a fixing portion 70*a*, a spring portion 70*b*, and a protrusion 70*c*. The positioning member 70 may be made of, for example, stainless steel, steel, aluminum, copper, brass, or the like.

The fixing portion 70*a* is a plate formed in a substantially U-shaped in a plan view. The fixing portion 70*a* is fixed to the ground pad 41 at a position close to the stud member 42 (refer to FIG. 12). In other words, the positioning member 70 can be mounted on the circuit board 24 at the same time as the process of mounting the stud member 42, the connector 30, etc. on the circuit board 24 by reflow soldering. The positioning member 70 is arranged on the opposite side (X2 side) from the electronic modules 32 and 33 side (X1 side) when viewed from the stud member 42.

The spring portion 70*b* is bent toward the Z2 side from the fixing portion 70*a* and stands upright. The spring portion 70*b* is formed, for example, in a substantially arch shape as a whole. The spring portion 70*b* is a leaf spring which extends along the Y direction and is elastically deformable at least in the X direction.

The protrusion 70*c* is a small dome-shaped protrusion which is provided in the center of the spring portion 70*b* in the longitudinal direction and protrudes toward the supporting tool 40B side. The tip end of the protrusion 70*c* is subjected to a biasing force of the spring portion 70*b* and is constantly pressed toward and in contact with the outer circumferential surface of the large diameter portion 72*a*. When the lock member 44B rotates, the protrusion 70*c* can selectively engage with one of the recesses 74*a* and 74*b* formed on the outer circumferential surface of the shaft portion 72.

Next, a method of attaching the supporting tool 40B and a method of supporting the electronic modules 32 and 33 by the supporting tool 40A will be described. The method of supporting one electronic module 32 will be representatively described even here, but the method of supporting the other electronic module 33 can also be made identical or similar.

As illustrated in FIG. 12, even in the supporting tool 40B, a method of fixing the stud member 42 to the ground pad 41 and mounting the supporting tool 40B on the circuit board 24 can be performed in the same manner as in the case of the supporting tool 40 described above. Other than the supporting tool 40B not having the resistance member 46 being the O-ring, a method of assembling the lock member 44B to the stud member 42 can be performed in the same manner as in the case of the supporting tool 40 described above.

When mounting the electronic module 32 on the circuit board 24 using the supporting tool 40B, the lock member 44B of the supporting tool 40B is placed in the unlocked position as illustrated in FIG. 11A. At this time, in the lock member 44B, the protrusion 70*c* of the positioning member 70 is engaged with one recess 74*b* of the shaft portion 72. Therefore, the supporting tool 40B does not have the resistance member 46 as in the above-described supporting tool 40, but can be securely held in the unlocked position.

Next, the terminal 32*b* is connected to the connector 30, and the other end 32*a*2 is placed immediately beside the supporting tool 40B held in the unlocked position, and then the lock member 44B is operated to rotate. That is, as illustrated in FIG. 11B, the lock member 44B is rotated with a predetermined tool or the like to the locked position. At this time, the spring portion 70*b* is elastically deformed, so that the protrusion 70*c* is released from the recess 74*b*, and then slides along the outer circumferential surface of the large diameter portion 72*a*. When the lock member 44B is rotated 180 degrees, the protrusion 70*c* then engages with the other recess 74*a*, thereby producing a clicking sensation.

Therefore, the supporting tool 40B can reliably position and hold the lock member 44B in the locked position while obtaining an appropriate clicking sensation. Thus, the electronic module 32 is attached to the circuit board 24 with the one end 32al connected to the connector 30 and the other end 32a2 supported by the supporting tool 40B.

When removing the electronic module 32 from the circuit board 24, the lock member 44B is rotated with a predetermined tool or the like to the unlocked position illustrated in FIG. 11A. In this case as well, the protrusion 70c disengages from the recess 74a due to the elastic deformation of the spring portion 70b, and then re-engages with the recess 74b, thereby producing an appropriate clicking sensation. As a result, the electronic module 32 can be easily removed from the circuit board 24.

Therefore, in this type of supporting tool 40B as well, the lock member 44B can be rotated from the unlocked position to the locked position, and can be held in each position. For this reason, in the circuit board 24 equipped with the supporting tool 40B and the electronic apparatus 10, the workability of attaching and detaching the electronic modules 32 and 33 is improved, and the electronic modules can be supported stably.

When the protrusion 70c of the supporting tool 40B moves between the recesses 74a and 74b, the supporting tool 40B slides on the outer circumferential surface of the shaft portion 72 by receiving the biasing force of the spring portion 70b. Therefore, a rotational torque is applied to the rotation of the lock member 44B although the torque is small even in the case of the supporting tool 40B. However, since the protrusion 70c and the shaft portion 72 are both made of a metal member and easy to slide relative to each other, the rotational torque is extremely small. Therefore, the positioning structure of the lock member 44B using the positioning member 70 may be configured to obtain a sufficient rotational torque by using it together with the following supporting tools 40C and 40D.

Figure 13:
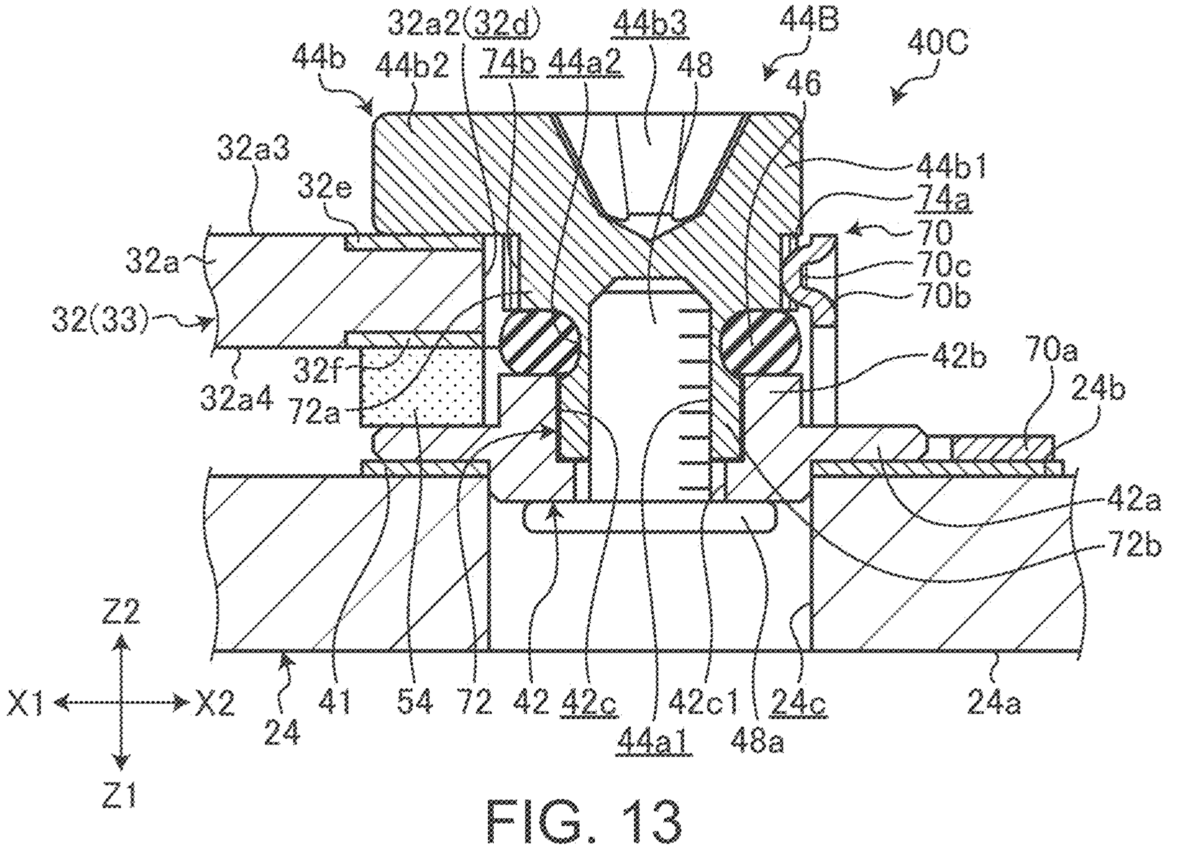
FIG. 13 is a schematic cross-sectional side view of an electronic module supported by a supporting tool according to a third modification.

FIG. 13 is a schematic cross-sectional side view of an electronic module 32 (33) supported by the supporting tool 40C according to a third modification.

The supporting tool 40C illustrated in FIG. 13 is different from the supporting tool 40B illustrated in FIGS. 10A to 12 in that the resistance member 46 is attached to the shaft portion 72. The shaft portion 72 of the supporting tool 40C has a groove 44a2 on the outer circumferential surface of the base portion of the small diameter portion 72b relative to the large diameter portion 72a. The resistance member 46 which is an O-ring is fitted in the groove 44a2.

In the supporting tool 40C as well, the lock member 44B can be positioned at the locked position and the unlocked position by the positioning member 70, and a clicking sensation can be obtained upon rotational operation. Further, in the supporting tool 40C, the resistance member 46 applies a sufficient rotational torque to rotate the lock member 44B. Therefore, in comparison to the supporting tool 40B, the supporting tool 40C provides improved operability during the rotational operation of the lock member 44B and also provides improved holding stability in the locked and unlocked positions.

Figure 14:
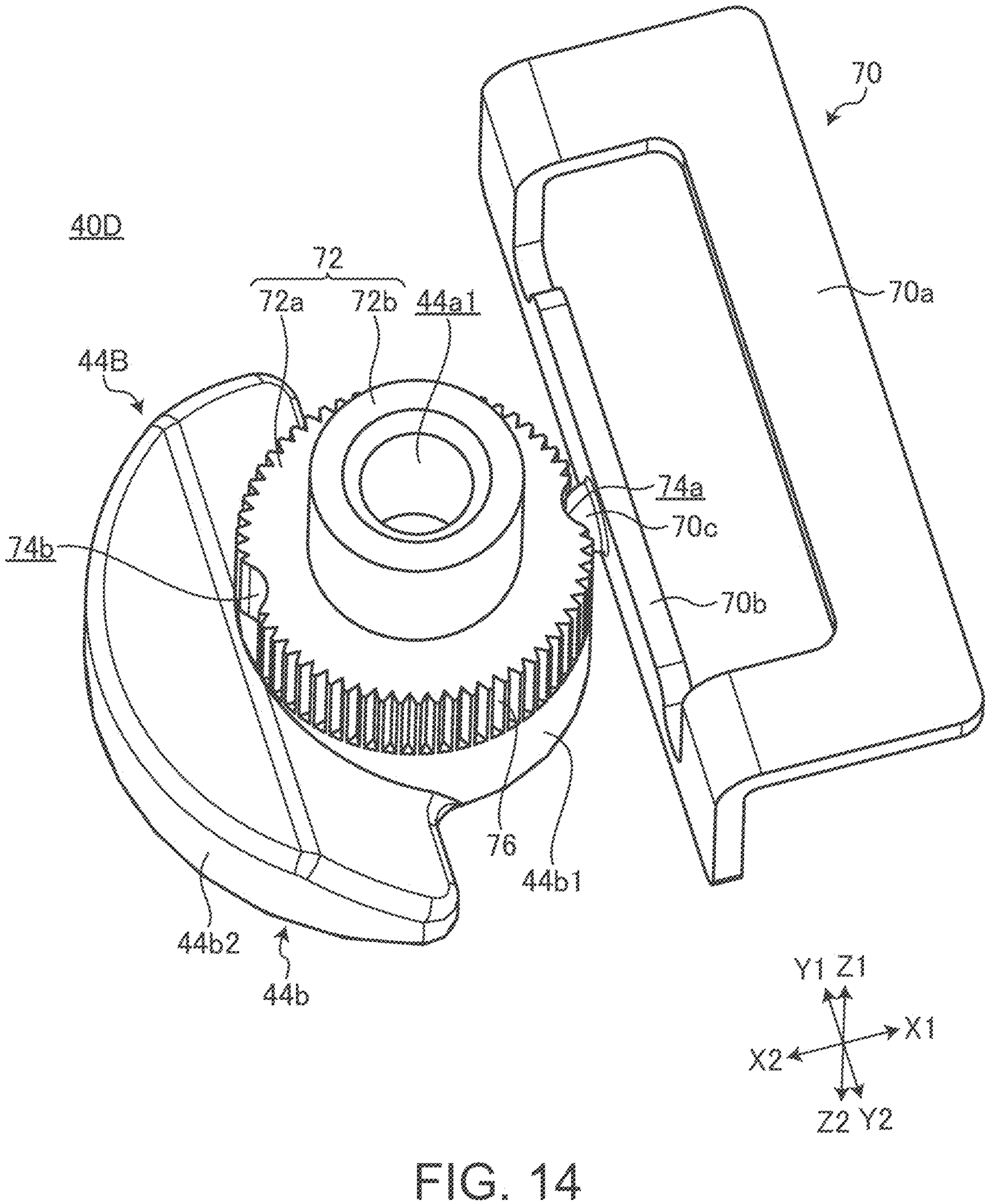
FIG. 14 is a perspective view of a supporting tool and a positioning member according to a fourth modification.

FIG. 14 is a perspective view of the supporting tool 40D and the positioning member 70 according to a fourth modification.

The supporting tool 40D illustrated in FIG. 14 is different from the supporting tool 40B illustrated in FIGS. 10A to 12 in that resistance portions 76 are provided on the outer circumferential surface of the large diameter portion 72a of the shaft portion 72. In FIG. 14, illustration of the stud member 42 is omitted. The resistance portions 76 are concave-convex shapes or spline grooves formed at equal intervals along the circumferential direction on the outer circumferential surface of the large diameter portion 72a. The groove of the resistance portion 76 is shallower and narrower in depth than the recesses 74a and 74b, and is shaped so that the protrusion 70c cannot fully engage therewith.

In the supporting tool 40D, when the lock member 44B rotates, the protrusion 70c of the positioning member 70 continuously contacts the concaves and convexes of the resistance portions 76, so that a rotational resistance and a rotational operation sensation are imparted to the lock member 44B. In other words, the resistance portions 76 and the protrusion 70c function as a torque generating portion which applies a rotational torque to the rotation of the lock member 44B. Therefore, in comparison with the supporting tool 40B, the supporting tool 40D provides improved operability during the rotational operation of the lock member 44B. The resistance portions 76 can also be configured, for example, by providing a rubber sheet or surface treatment on the outer circumferential surface of the shaft portion 72 to impart a frictional resistance to the protrusion 70c. The resistance portions 76 can be used simultaneously with the resistance member 46 illustrated in FIG. 13.

It should be noted that the present invention is not limited to the above-described embodiments, and can of course be freely modified within the scope not departing from the spirit of the present invention.

DESCRIPTION OF SYMBOLS

10 electronic apparatus
12 chassis
24 circuit board
30 connector
32, 33 electronic module
40, 40A to 40D supporting tool
42, 42A stud member
42a flange
42b, 60 protruding portion
42c, 61 hole
44, 44A, 44B lock member
44a, 62, 72 shaft portion
44a1 screw hole
44a2 groove
44b plate portion
46, 46A resistance member
48 screw
70 positioning member
70b spring portion
70c protrusion
74a, 74b recess
76 resistance portion

What is claimed is:

1. A circuit board comprising:

a connector connecting one end of an electronic module, and a supporting tool supporting the other end of the electronic module, both being mounted on the circuit board, wherein the supporting tool includes a stud member having a flange fixed to a surface of the circuit board and a protruding portion rising from the flange;

a lock member which is supported so as to be rotatable relative to the protruding portion and is switchable between a locked position in which the other end of the electronic module is pressed and an unlocked position in which the other end is released from pressing;

a torque generating portion which applies a rotational torque to the rotation of the lock member; and a positioning member which is mounted on the surface of the circuit board and is capable of selectively positioning the lock member between the locked position and the unlocked position by contacting the lock member.

2. The circuit board according to claim 1, wherein the torque generating portion includes a resistance member which generates a rotational resistance between the lock member and the protruding portion.

3. The circuit board according to claim 2, wherein the protruding portion has a hole extending along a protruding direction, wherein the lock member includes a shaft portion inserted into the hole so as to be capable of rotating relative to the hole, wherein the lock member includes a plate portion provided at one end of the shaft portion and capable of supporting the electronic module by rotating between the locked position and the unlocked position, and wherein the resistance member is an O-ring which is attached to an outer circumferential surface of the shaft portion and sandwiched between the plate portion and a tip surface of the protruding portion.

4. The circuit board according to claim 3, wherein the shaft portion has an annular groove formed on the outer circumferential surface of the shaft portion, and wherein the O-ring is fitted into the groove.

5. The circuit board according to claim 3, wherein the shaft portion is prevented from coming off the stud member by a screw fastened from a rear side of the flange with respect to a tip portion of the shaft portion inserted into the hole.

6. The circuit board according to claim 1, wherein the protruding portion has a hole along an axial direction, wherein the lock member includes:

a shaft portion inserted into the hole so as to be rotatable relative to the hole, and a plate portion provided at one end of the shaft portion and capable of supporting the electronic module by rotating between the locked position and the unlocked position, wherein the shaft portion has a pair of recesses formed on an outer circumferential surface of the shaft portion and arranged 180 degrees away from each other, and wherein the positioning member includes:

a protrusion capable of selectively engaging with one of the pair of recesses when the lock member is rotated, and a spring portion which presses the protrusion against the outer circumferential surface of the shaft portion.

7. The circuit board according to claim 6, wherein the torque generating portion includes a resistance portion which is provided on the outer circumferential surface of the shaft portion and applies a rotational resistance to the lock member by coming into contact with the protrusion when the lock member is rotated.

8. An electronic apparatus comprising:

a circuit board on which a connector is mounted;

an electronic module having one end connected to the connector;

a supporting tool which supports the other end of the electronic module on the circuit board, wherein the supporting tool includes:

a stud member having a flange fixed to a surface of the circuit board and a protruding portion rising from the flange, a lock member which is supported so as to be rotatable relative to the protruding portion and is switchable between a locked position in which the other end of the electronic module is pressed and an unlocked position in which the other end is released from pressing, and a torque generating portion which applies a rotational torque to the rotation of the lock member; and a positioning member which is mounted on the surface of the circuit board and is capable of selectively positioning the lock member between the locked position and the unlocked position by contacting the lock member.

9. The electronic apparatus according to claim 8, wherein the torque generating portion includes a resistance member which generates a rotational resistance between the lock member and the protruding portion.

10. The electronic apparatus according to claim 9, wherein the protruding portion has a hole extending along an axial direction, wherein the lock member includes:

a shaft portion inserted into the protruding portion so as to be capable of rotating relative to the protruding portion, and a plate portion provided at one end of the shaft portion and capable of supporting the electronic module by rotating between the locked position and the unlocked position, and wherein the resistance member is an O-ring which is attached to an outer circumferential surface of the shaft portion and sandwiched between the plate portion and a tip surface of the protruding portion.

* * * * *